United States Patent
Weber et al.

(10) Patent No.: US 11,396,915 B2
(45) Date of Patent: Jul. 26, 2022

(54) METHOD AND OPEN-LOOP AND CLOSED-LOOP CONTROL DEVICE FOR COMPENSATING FOR A CLUTCH TORQUE OF A HYBRID SEPARATING CLUTCH TAKING INTO CONSIDERATION THE ROTATIONAL SPEED OF AN ELECTRIC MACHINE

(71) Applicant: SCHAEFFLER TECHNOLOGIES AG & CO. KG, Herzogenaurach (DE)

(72) Inventors: Christian Weber, Karlsruhe (DE); Ralf Mannsperger, Achern (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 211 days.

(21) Appl. No.: 16/626,092

(22) PCT Filed: May 25, 2018

(86) PCT No.: PCT/DE2018/100510
§ 371 (c)(1),
(2) Date: Dec. 23, 2019

(87) PCT Pub. No.: WO2019/001622
PCT Pub. Date: Jan. 3, 2019

(65) Prior Publication Data
US 2020/0208690 A1    Jul. 2, 2020

(30) Foreign Application Priority Data
Jun. 26, 2017   (DE) .......................... 102017114055.7

(51) Int. Cl.
*F16D 48/06*     (2006.01)
*B60K 6/387*    (2007.10)

(52) U.S. Cl.
CPC .............. *F16D 48/06* (2013.01); *B60K 6/387* (2013.01); *B60Y 2200/92* (2013.01); *F16D 2500/102* (2013.01); *F16D 2500/3067* (2013.01)

(58) Field of Classification Search
CPC .............. F16D 48/06; F16D 2500/102; F16D 2500/3067; B60K 6/387; B60K 6/48;
(Continued)

(56) References Cited

U.S. PATENT DOCUMENTS

| | | | | |
|---|---|---|---|---|
| 2015/0283989 A1* | 10/2015 | Liang | .................... | B60W 10/06 477/5 |
| 2016/0159343 A1* | 6/2016 | Hata | .................... | B60W 20/40 477/5 |

(Continued)

FOREIGN PATENT DOCUMENTS

| | | |
|---|---|---|
| DE | 10127766 A1 | 1/2002 |
| DE | 102008027071 A1 | 1/2009 |

(Continued)

*Primary Examiner* — David J Hlavka
(74) *Attorney, Agent, or Firm* — Nathan Smith

(57) ABSTRACT

A method and an open-loop and closed-loop control device for compensating for a clutch torque of a separating clutch located between an internal combustion engine and an electric machine in a hybrid drive of a motor vehicle. The compensation takes into consideration the rotational speed of the electric machine. The rotational speed of the electric machine impacts clutch torque. A compensation factor is calculated, and increases or decreases the necessary clutch torque, causing a corresponding actuation of an actuator to achieve the necessary clutch torque.

9 Claims, 2 Drawing Sheets

(58) Field of Classification Search
CPC . B60K 6/24; B60W 20/40; B60W 2050/0087; B60W 2050/0088; B60W 2510/81; B60W 2710/022; B60W 2710/027; B60W 10/02; B60W 10/06; B60W 10/08; B60W 2050/0008; B60W 2050/0012; B60W 2510/0638
See application file for complete search history.

(56) References Cited

U.S. PATENT DOCUMENTS

| | | | | |
|---|---|---|---|---|
| 2016/0160943 | A1* | 6/2016 | Karlsson | F16D 48/06 701/68 |
| 2016/0377131 | A1* | 12/2016 | Ziefle | F16D 48/064 701/22 |
| 2017/0067518 | A1* | 3/2017 | Hodrus | F16D 48/08 |
| 2017/0080793 | A1* | 3/2017 | Suyama | F16H 57/042 |

FOREIGN PATENT DOCUMENTS

| | | |
|---|---|---|
| DE | 102010023505 A1 | 12/2011 |
| DE | 102013104747 A1 | 11/2014 |
| DE | 102013226115 A1 | 7/2015 |
| DE | 102016222466 A1 | 5/2017 |
| EP | 2011681 A2 | 1/2009 |

* cited by examiner

METHOD AND OPEN-LOOP AND CLOSED-LOOP CONTROL DEVICE FOR COMPENSATING FOR A CLUTCH TORQUE OF A HYBRID SEPARATING CLUTCH TAKING INTO CONSIDERATION THE ROTATIONAL SPEED OF AN ELECTRIC MACHINE

CROSS-REFERENCE TO RELATED APPLICATIONS

This application is the U.S. National Phase of PCT/DE2018/100510 filed May 25, 2018, which claims priority to DE 10 2017 114 055.7 filed Jun. 26, 2017, the entire disclosures of which are incorporated by reference herein.

TECHNICAL FIELD

This disclosure relates to a method for compensating for a clutch torque of a hybrid separating clutch, taking into consideration the rotational speed of an electric machine. Here, the electric machine is part of a hybrid drive of a motor vehicle. The separating clutch is provided between an internal combustion engine and the electric machine. In addition, an actuator is assigned to actuate the separating clutch.

This disclosure also relates to an open-loop and closed-loop control device for compensating for a clutch torque of a separating clutch which is provided between an internal combustion engine and an electric machine.

BACKGROUND

German laid-open specification DE 101 27 766 A1 discloses a method and a device for compensating for the influence of the rotational speed on the actuating torque characteristic curve of a clutch. For this purpose, the rotational speed of the clutch is measured and a target position of an actuating element for the clutch, corresponding to the actuating torque characteristic curve, is changed as a function of the rotational speed. This rotational speed compensation takes into consideration only the internal combustion engine speed.

German laid-open specification DE 10 2008 027 071 A1 discloses a method for frictional coefficient adaptation of a friction clutch arranged between an electric machine and an internal combustion engine in a hybrid drive train and actuated by a clutch actuator. The frictional coefficient is adapted by means of a torque transmitted from a friction clutch, which is determined when starting the internal combustion engine by means of the electric machine.

German laid-open specification DE 10 2016 222 466 A1 discloses a method for checking the torque transmission behavior of a separating clutch of a hybrid drive for a motor vehicle. Provision is made for the hybrid drive to be changed to an operating state with engaged separating clutch in order to check the torque transmission behavior of the separating clutch, in which operating state the excessive power from the internal combustion engine is converted via the electric machine into electrical energy, wherein the occurrence of measurable slippage in this operating state is analyzed.

SUMMARY

This disclosure is based on an object of devising a method for compensating for a clutch torque of a separating clutch in which the rotational speed of an electric machine of a hybrid drive train of a motor vehicle is taken into consideration for the compensation.

This object is achieved by a method for compensating for a clutch torque of the separating clutch, taking into consideration the rotational speed of an electric machine.

A further object is to devise an open-loop and closed-loop control device for compensating for a clutch torque of a separating clutch which is provided between an internal combustion engine and an electric machine, wherein the open-loop and closed-loop control device is intended to take the rotational speed of the electric machine into consideration for the compensation of the clutch torque.

The above object may be achieved by an open-loop and closed-loop control device for compensating for a clutch torque of a separating clutch.

The method according to this disclosure for compensating for a clutch torque of a separating clutch, taking into consideration the rotational speed of an electric machine of a hybrid drive for a motor vehicle, is distinguished by the fact that the separating clutch is provided between the internal combustion engine and the electric machine. In addition, an actuator is assigned to the separating clutch, which is provided to actuate the same. According to the method, firstly a calibration function is stored in an open-loop and closed-loop control device. The calibration function represents a factor as a function of the rotational speed of the electric machine. Then, during driving operation, an appropriate clutch torque is required from the separating clutch. By using the calibration function stored in memory, a disengagement travel is then calculated and set on the actuator. Depending on the rotational speed of the electric machine, a factor which internally increases or decreases the required clutch torque is then calculated.

The characteristic curve or calibration function, which is stored in the open-loop and closed-loop control device in the memory provided therefor and which specifies the torque capacity of the clutch as a function of the disengagement travel of the actuator, is adapted while taking the rotational speed of the electric machine into consideration such that the action of the rotational speed on the torque capacity is compensated. This is one advantage.

In one embodiment, the factor that depends on the rotational speed of the electric machine is the disengagement travel of the actuator, which is added to or subtracted from a current position of the actuator. As a result of the addition or subtraction, the influence of the rotational speed of the electric machine on the required clutch torque is counteracted.

In one embodiment, between the clutch torque required during driving operation and the calculation of the position of the actuator, the factor that depends on the rotational speed of the electric machine is calculated. In this way, it is in particular possible to set a position of the actuator which depends on a characteristic curve of the clutch torque and at the same time on the rotational speed of the electric machine. As a result, it is possible to set the accuracy of the disengagement travel-dependent torque capacity exactly.

Also provided is a computer program product, which is provided on a non-volatile and computer-readable medium. By using the computer program product, an open-loop and closed-loop control device is caused to set the method for compensating for the clutch torque of a separating clutch which is provided between an internal combustion engine and an electric machine.

A further aspect of this disclosure is that an open-loop and closed-loop control device for compensating for a clutch torque of a separating clutch is presented, wherein the separating clutch is provided between an internal combustion engine and an electric sheet. The open-loop and closed-loop control device comprises a memory, in which a calibration function which represents a factor as a function of the rotational speed of the electric machine is stored. An actuator of the separating clutch is connected to the open-loop and closed-loop control device via a communications link. Via the communications link, during driving operation the actuator receives from the open-loop and closed-loop control device a measure for the disengagement travel of the actuator of the separating clutch. As a result, an appropriate clutch torque of the separating clutch can be set. Likewise, the electric machine is connected to the open-loop and closed-loop control device via a communications link. Depending on the rotational speed of the electric machine, a factor which internally increases or reduces the required clutch torque of the separating clutch is calculated.

In one embodiment, a calculated disengagement travel of the separating clutch can be set by the actuator of the separating clutch as a function of the rotational speed of the electric machine, so that compensation of the rotational speed of the electric machine is possible.

Furthermore, a hybrid drive for a motor vehicle is disclosed, which has an internal combustion engine, an electric machine and a separating clutch interposed between the internal combustion engine and the electric machine. An open-loop and closed-loop control device comprises a memory, in which a calibration function which represents a factor as a function of the rotational speed of the electric machine is stored.

The calibration function or the calibration curve has the rotational speed of the electric machine plotted on the horizontal axis. Represented on the vertical axis is a factor which expresses the influence on the torque capacity of the separating clutch. During travel with the motor vehicle, a torque is required from the separating clutch. By using the calibration function or the calibration curve, a disengagement travel is calculated and set on the actuator of the separating clutch. Between the requirement for the clutch torque and the calculation of the position of the actuator, depending on the rotational speed of the electric machine, a factor is calculated which internally increases or reduces the required torque. As a result, a position of the actuator is set which depends on the torque characteristic curve and at the same time on the rotational speed of the electric machine. It is thus possible that, by using the disclosure provided herein, the action of the rotational speed effect on the torque capacity of the separating clutch is compensated.

BRIEF DESCRIPTION OF THE DRAWINGS

Exemplary embodiments will explain the invention and its advantages in more detail below by using the appended figures. The size relationships in the figures do not always correspond to the actual size relationships, since some shapes are represented as simplified and other shapes as enlarged in relation to other elements, for purposes of improved illustration. In the figures.

Identical designations are used for identical or identically acting elements of the disclosure. In addition, for clarity, only designations which are required for the description of the respective figure are illustrated in the individual figures.

DETAILED DESCRIPTION

Figure 1:
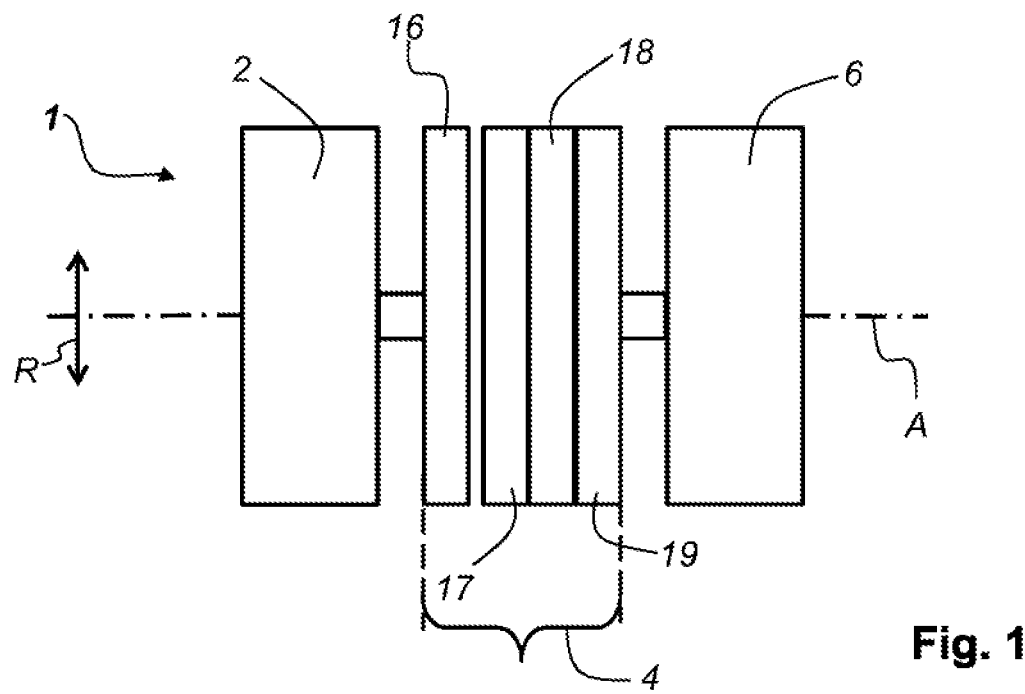
FIG. 1 shows a schematic view of a separating clutch which is arranged between an internal combustion engine and an electric machine (serial hybrid drive train)

FIG. 1 shows a schematic illustration of a separating clutch 4, which is provided between an internal combustion engine 2 and an electric machine 6 of an embodiment of a hybrid drive 1. The separating clutch 4 comprises a clutch disk 16, a disk spring 17, a pressure plate 18 and a mating pressure plate 19. The clutch disk 16 is co-rotationally connected to the internal combustion engine 2. The disk spring 17, the pressure plate 18 and the mating pressure plate 19 are co-rotationally connected to the electric machine 6. In one embodiment, the disk spring 17, the pressure plate 18 and the mating pressure plate 19 are integrated with the rotor (not illustrated) of the electric machine 6 and rotate at the speed of rotation thereof (rotational speed).

Figure 2:
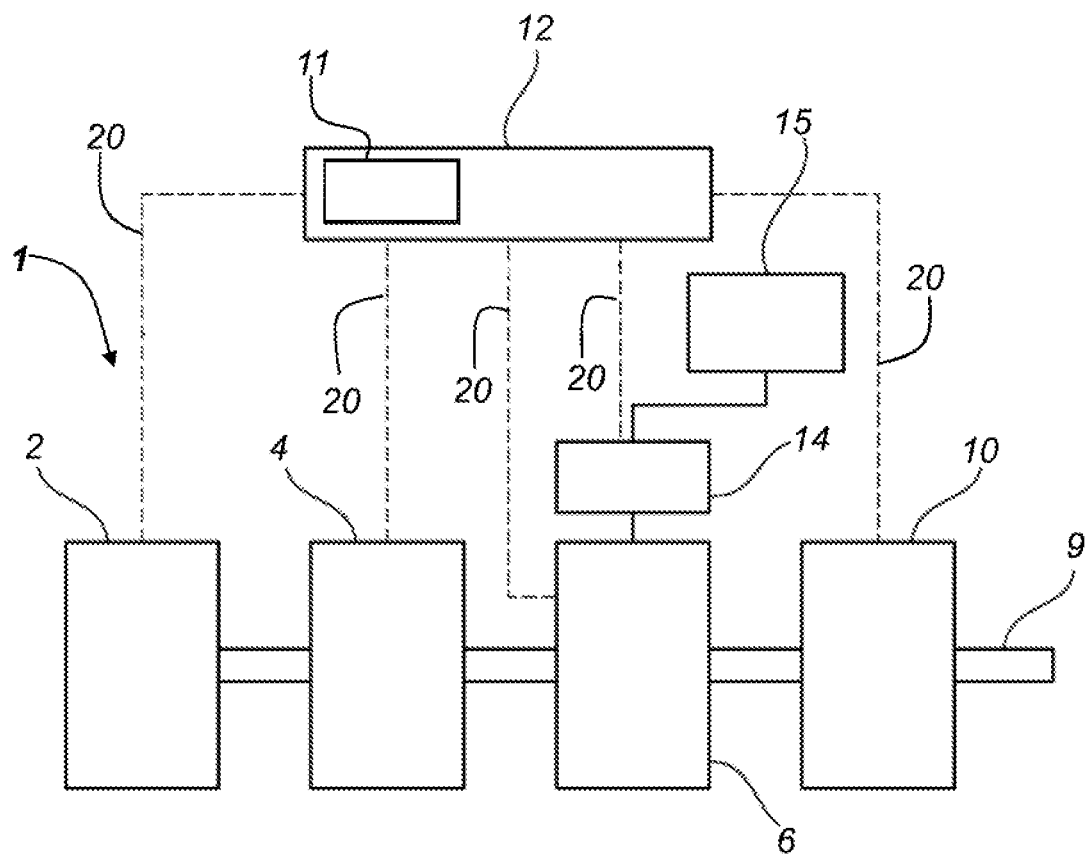
FIG. 2 shows a schematic illustration of a hybrid drive for a motor vehicle, in which a method for compensating for a clutch torque of a hybrid separating clutch, taking into consideration the rotational speed of an electric machine, is implemented.

FIG. 2 shows a schematic view of an embodiment of an open-loop and closed-loop control device 12 for compensating for a clutch torque of a separating clutch 4 which is provided between the internal combustion engine 2 and the electric machine 6 of a hybrid drive 1. The open-loop and closed-loop control device 12 comprises a memory 11, in which the calibration function (not illustrated) is stored. The calibration function represents a factor as a function of the rotational speed of the electric machine 6. The hybrid drive 1 substantially comprises the internal combustion engine 2, the separating clutch 4, the electric machine 6 and a transmission 10. All these elements are each connected to the open-loop and closed-loop control device 12 via a communications link 20. In addition, the electric machine 6 in the embodiment illustrated is assigned a charging device 14, via which an energy store 15 connected to the charging device 14 can be charged and via which the electric machine 6 takes the energy required for the drive from the energy store 15. The charging device 14 is likewise connected to the open-loop and closed-loop control device 12 via a communications link 20. Via the communications link 20, during driving operation, for example, the rotational speed of the internal combustion engine 2 and the rotational speed of the electric machine 6 are supplied to the open-loop and closed-loop control device 12. As already mentioned above, an appropriate calibration function, which represents a factor as a function of the rotational speed of the electric machine 6, is stored in the memory 11. During driving operation, the separating clutch 4 requires an appropriate clutch torque. By using the calibration function stored in the memory 11, a disengagement travel 9 of the actuator 8 (see FIG. 3) can be set in order that the disengagement travel 9 is matched to the rotational speed of the electric machine 6. Thus, by using the calibration function, a factor is calculated which, taking into consideration the rotational speed of the electric machine 6, internally increases or reduces the required clutch torque of the separating clutch 4. This has the advantage that the action of the rotational speed of the electric machine 6 compensates for the torque capacity of the separating clutch 4.

Figure 3:
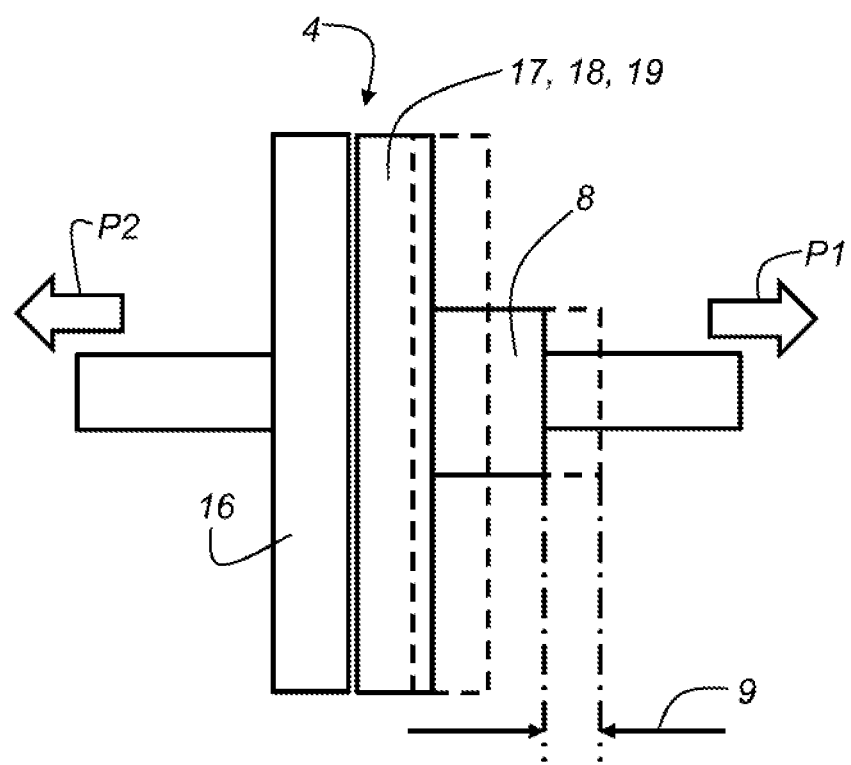
FIG. 3 shows a schematic representation of the mode of action of the actuator on the separating clutch.

FIG. 3 shows a schematic representation of the separating clutch 4 in conjunction with the actuator 8. The actuator 8 is provided on the side of the disk spring 17, pressure plate 18 and mating pressure plate 19. This means that the actuator 8 is provided on that side of the elements (disk spring 17, pressure plate 18 and mating pressure plate 19) of the separating clutch 4 which rotate at the rotational speed of the electric machine 6. The arrow P1 indicates the direction of the electric machine 6. The arrow P2 indicates the direction of the internal combustion engine 2. As already mentioned in the description relating to FIG. 2, by using the rotational speed of the electric machine 6, a factor is calculated which internally increases or reduces the required clutch torque. Depending on the driving situation or driving mode, an appropriate clutch torque is required from the separating clutch 4 in order to match the clutch torque to the rotational speed of the electric machine 6. Consequently, a corresponding disengagement travel 9, which is added to or subtracted from the current position of the actuator 8, is set on the actuator 8. This has the advantage that, as a result, the influence of the rotational speed of the electric machine 6 on the torque capacity can be counteracted and the accuracy of the torque capacity can be adjusted as a function of the disengagement travel 9. The magnitude of the disengagement travel 9 of the separating clutch 4 is thus likewise a measure of the torque capacity. The position of the actuator 8 is thus set depending on the calibration function (torque characteristic curve) and at the same time on the rotational speed of the electric machine 6. Thus, the action of the rotational speed effect on the torque capacity of the separating clutch 4 is compensated.

The disclosure has been described in relation to embodiments, which are in no way to be understood as a restriction of the claims. However, changes and modifications can be made without departing from the protective scope of the following claims.

LIST OF DESIGNATIONS

1 Hybrid drive
2 Internal combustion engine
4 Separating clutch
6 Electric machine
8 Actuator
9 Disengagement travel
10 Transmission
11 Memory
12 Open-loop and closed-loop control device
14 Charging device
15 Energy store
16 Clutch disk
17 Disk spring
18 Pressure plate
19 Mating pressure plate
20 Communications link
A Direction of the axis
P1 Arrow (direction of the electric machine)
P2 Arrow (direction of the internal combustion engine)
R Radial direction

The invention claimed is:

1. A method for compensating for a clutch torque of a separating clutch of a hybrid drive of a motor vehicle, taking into consideration a rotational speed of an electric machine, wherein the separating clutch is provided between an internal combustion engine and the electric machine and an actuator is assigned to the separating clutch for the actuation of the same comprising:
   a calibration function, which represents a factor as a function of the rotational speed of the electric machine is stored in a memory of an open-loop and closed-loop control device;
   during driving operation an appropriate clutch torque is required from the separating clutch and, by using the calibration function, a disengagement travel is calculated and set on the actuator; and
   depending on the rotational speed of the electric machine, a factor is calculated which internally increases or decreases the required clutch torque.

2. The method as claimed in claim 1, wherein the factor that depends on the rotational speed of the electric machine is the disengagement travel of the actuator, which is added to or subtracted from a current position of the actuator, in order to counteract an influence of the rotational speed of the electric machine on the required clutch torque.

3. The method as claimed in claim 1, wherein the factor that depends on the rotational speed of the electric machine is calculated chronologically between the clutch torque required during driving operation and the calculation of a position of the actuator.

4. The method as claimed in claim 1, wherein a position of the actuator is set which depends on a characteristic curve of the clutch torque and at the same time on the rotational speed of the electric machine.

5. A system for compensating for a clutch torque of a separating clutch which is provided between an internal combustion engine and an electric machine, the system comprising:
   an open-loop and closed-loop control device including a memory, in which a calibration function which represents a factor as a function of a rotational speed of the electric machine is stored; and
   an actuator of the separating clutch connected to the open-loop and closed-loop control device via a communications link, wherein, via the communications link during driving operation the actuator receives from the open-loop and closed-loop control device a measure for a disengagement travel of the actuator, in order to set a required clutch torque of the separating clutch;
   wherein the electric machine is connected via the communications link to the open-loop and closed-loop control device, which, depending on the rotational speed of the electric machine, calculates a factor which internally increases or reduces the required clutch torque of the separating clutch.

6. The open-loop and closed-loop control device as claimed in claim 5, wherein by using the actuator of the separating clutch, the disengagement travel of the separating clutch that is calculated as a function of the rotational speed of the electric machine can be set.

7. A system for compensating a clutch torque of a separating clutch, the system comprising:
   the separating clutch located axially between an internal combustion engine and an electric machine:
   an actuator configured to selectively actuate the separating clutch; and
   a control device coupled to the electric machine and configured to:
      determine a rotational speed of the electric machine, and
   determine a required clutch torque for actuation of the separating clutch that increases or decreases depending on the rotational speed of the electric machine,
   commanding the actuator to move a desired travel distance that corresponds with the rotational speed of the electric machine to achieve the required clutch torque
   wherein the clutch includes a disk spring, a pressure plate, and a mating pressure plate, wherein the disk spring, the pressure plate, and the mating pressure plate are integrated with a rotor of the electric machine to rotate therewith.

8. The system of claim 7, wherein the clutch further includes a clutch disk configured to co-rotationally connect to the internal combustion engine, wherein the disk spring co-rotationally connected to the electric machine, wherein the pressure plate co-rotationally connected to the electric machine, and wherein the mating pressure plate co-rotationally connected to the electric machine.

9. The system of claim 7, wherein the control device is an open-loop and closed-loop control device.

\* \* \* \* \*